United States Patent
Morishita et al.

(10) Patent No.: US 9,372,112 B2
(45) Date of Patent: Jun. 21, 2016

(54) TRAVELING ENVIRONMENT DETECTION DEVICE

(71) Applicant: DENSO CORPORATION, Kariya, Aichi-pref. (JP)

(72) Inventors: Taiji Morishita, Obu (JP); Hironori Sato, Okazaki (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/402,018

(22) PCT Filed: May 14, 2013

(86) PCT No.: PCT/JP2013/063368
§ 371 (c)(1),
(2) Date: Nov. 18, 2014

(87) PCT Pub. No.: WO2013/172324
PCT Pub. Date: Nov. 21, 2013

(65) Prior Publication Data
US 2015/0131086 A1    May 14, 2015

(30) Foreign Application Priority Data
May 18, 2012 (JP) .................. 2012-114854

(51) Int. Cl.
*G06F 7/00* (2006.01)
*G01J 1/42* (2006.01)
(Continued)

(52) U.S. Cl.
CPC ................. *G01J 1/4257* (2013.01); *B60Q 1/14* (2013.01); *B60Q 1/1423* (2013.01); *G08G 1/166* (2013.01); *B60Q 2300/314* (2013.01)

(58) Field of Classification Search
CPC ........ B60Q 1/143; B60Q 1/1423; B60Q 1/14; G01J 1/4257; G08G 1/166
See application file for complete search history.

(56) References Cited

U.S. PATENT DOCUMENTS

2005/0036660 A1   2/2005   Otsuka et al.
2005/0152581 A1   7/2005   Hoki et al.
(Continued)

FOREIGN PATENT DOCUMENTS

JP   H10-11582    1/1998
JP   H11-139225   5/1999
(Continued)

OTHER PUBLICATIONS

Office Action dated Oct. 6, 2015 issued in the corresponding JP application No. 2012-114854 in Japanese with English translation.
(Continued)

*Primary Examiner* — Michael D Lang
(74) *Attorney, Agent, or Firm* — Harness, Dickey & Pierce, P.L.C.

(57) ABSTRACT

A driving environment detection device acquires a captured image of the direction the host vehicle is travelling in, and from the captured image, extracts parameters relating to brightness of a road surface for a road driven by the host vehicle. Then, on the basis of the parameters, the driving environment of the vehicle is estimated. By way of such a light control system, it is possible to more accurately detect ambient brightness by estimating the driving environment in accordance with the parameters related to the brightness of the road surface. Therefore, it is possible to accurately detect the driving environment.

7 Claims, 6 Drawing Sheets

(51) Int. Cl.
    *B60Q 1/14*     (2006.01)
    *G08G 1/16*     (2006.01)

(56) References Cited

U.S. PATENT DOCUMENTS

| | | | |
|---|---|---|---|
| 2006/0159309 A1 | 7/2006 | Tsukamoto | |
| 2008/0278577 A1 | 11/2008 | Otsuka et al. | |
| 2010/0020170 A1* | 1/2010 | Higgins-Luthman et al. | 348/135 |
| 2010/0134011 A1 | 6/2010 | Kobayashi | |

FOREIGN PATENT DOCUMENTS

| | | | |
|---|---|---|---|
| JP | 2005-092861 | | 4/2005 |
| JP | 2005-201741 | | 7/2005 |
| JP | 2006-193068 | | 7/2006 |
| JP | 2008-293116 | | 12/2008 |
| JP | 2010-036757 | | 2/2010 |
| JP | 2010-040001 | | 2/2010 |
| JP | 2010036757 | * | 2/2010 |
| JP | 2010-132053 | | 6/2010 |
| JP | 2011-143822 | | 7/2011 |

OTHER PUBLICATIONS

International Preliminary Report on Patentability and Written Opinion for PCT/JP2013/063368, mailed Nov. 27, 2014, in Japanese with English translation.

International Search Report for PCT/JP2013/063368, mailed Jul. 2, 2013, in Japanese with English translation.

* cited by examiner

FIG.3
(a)
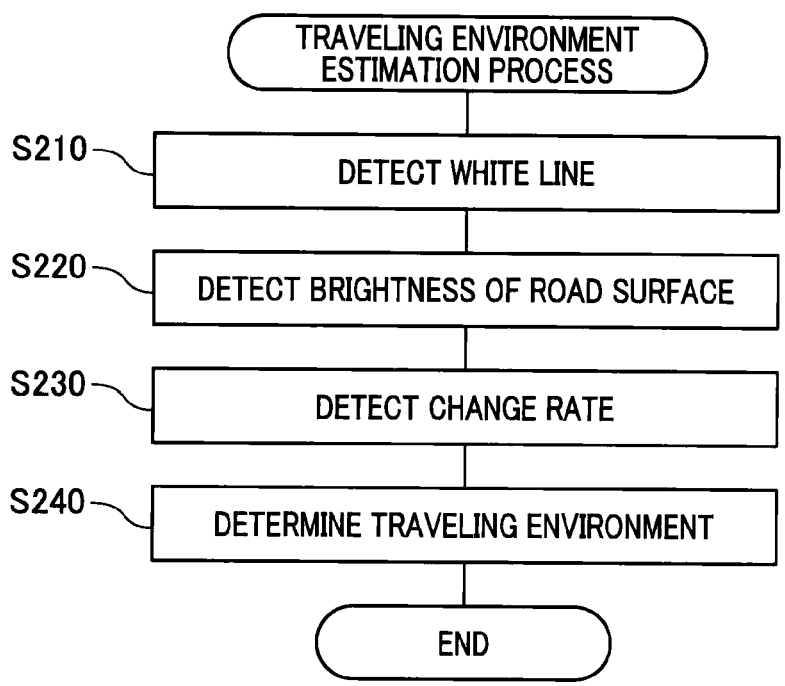
(b)
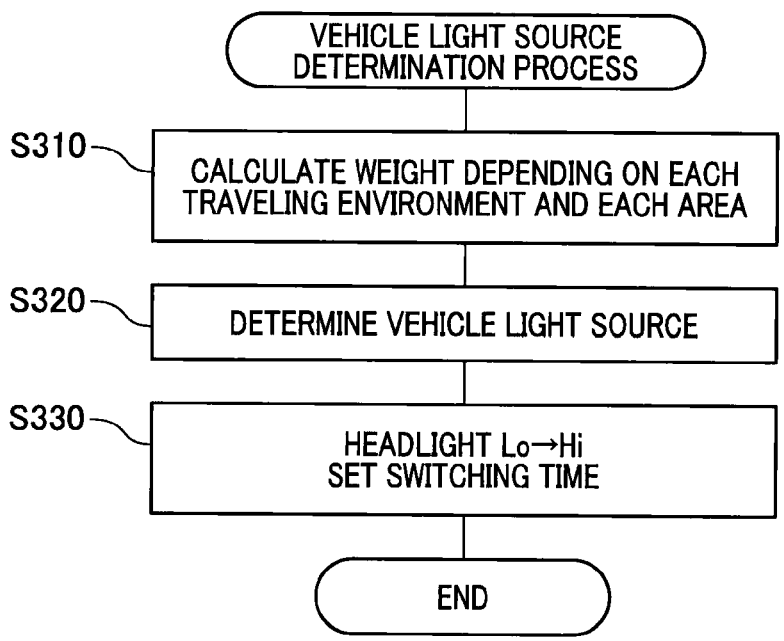

FIG.4

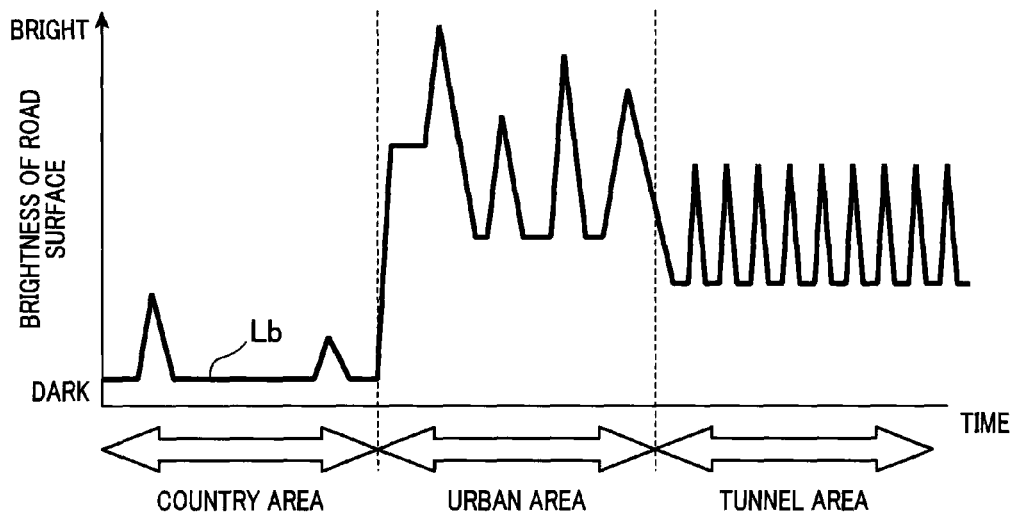

|  | COUNTRY AREA | URBAN AREA | TUNNEL AREA |
|---|---|---|---|
| BRIGHTNESS | DARK | BRIGHT | BRIGHT |
| CHANGE PERIOD | LONG & NO PERIODICITY | SHORT OR LONG = NO PERIODICITY | SHORT & PERIODIC |
| CHANGE AMOUNT | SMALL TO MEDIUM | SMALL TO LARGE | SMALL TO MEDIUM<br>SMALL VARIABILITY IN THE SAME TUNNEL |

(b)

|  | INSIDE TRAVELING ZONE | OUTSIDE TRAVELING ZONE |
|---|---|---|
| ONCOMING VEHICLE | MANY | FEW (SLOPE, INTERSECTION, etc.) |
| LEADING VEHICLE | MANY | FEW (SLOPE, INTERSECTION, etc.) |
| REFLECTOR | FEW (EXIST WITHIN TRAVELING ZONE, WHEN TRAVELING DIRECTION IS CURVED) | MANY |
| SIGN etc. | FEW (EXIST WITHIN TRAVELING ZONE, WHEN TRAVELING DIRECTION IS CURVED) | MANY |

FIG.6

(a) EXAMPLE: IN CASE OF LEFT-HAND TRAFFIC

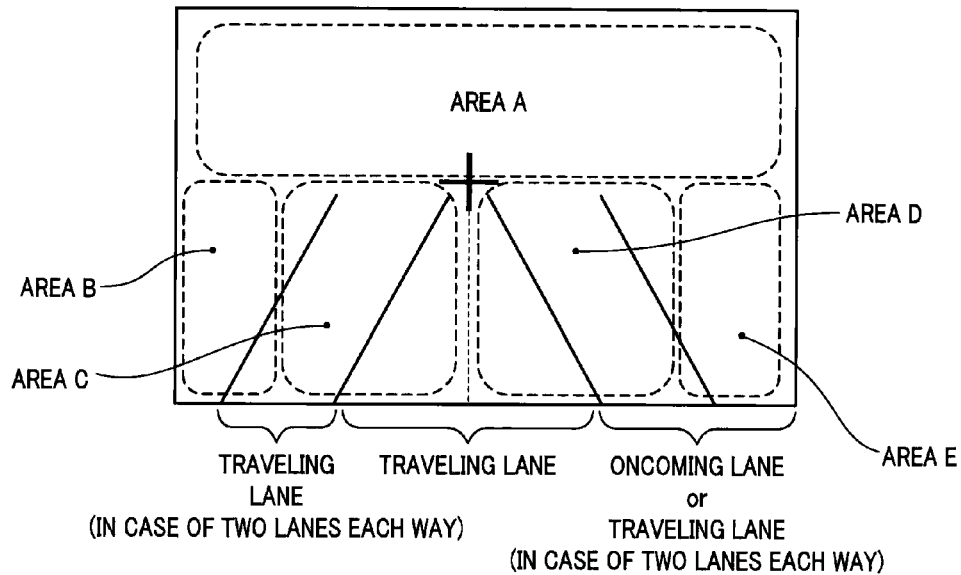

TRAVELING LANE | TRAVELING LANE
(IN CASE OF TWO LANES EACH WAY)

ONCOMING LANE or TRAVELING LANE
(IN CASE OF TWO LANES EACH WAY)

(b) WEIGHT FOR EACH AREA
(PROBABILITY: IN ORDER OF VERY LARGE > LARGE > ORDINARY > SMALL > VERY SMALL >> 0)

|  | AREA A | AREA B | AREA C | AREA D | AREA E |
|---|---|---|---|---|---|
| COUNTRY AREA | LEADING VEHICLE: ORDINARY<br>ONCOMING VEHICLE: ORDINARY | LEADING VEHICLE: SMALL<br>ONCOMING VEHICLE: VERY SMALL | LEADING VEHICLE: ORDINARY<br>ONCOMING VEHICLE: SMALL | LEADING VEHICLE: SMALL<br>ONCOMING VEHICLE: LARGE | LEADING VEHICLE: VERY SMALL<br>ONCOMING VEHICLE: SMALL |
| URBAN AREA | LEADING VEHICLE: VERY SMALL<br>ONCOMING VEHICLE: VERY SMALL | LEADING VEHICLE: ORDINARY<br>ONCOMING VEHICLE: VERY SMALL | LEADING VEHICLE: LARGE<br>ONCOMING VEHICLE: SMALL | LEADING VEHICLE: ORDINARY<br>ONCOMING VEHICLE: LARGE | LEADING VEHICLE: SMALL<br>ONCOMING VEHICLE: ORDINARY |
| TUNNEL AREA | LEADING VEHICLE: 0<br>ONCOMING VEHICLE: 0 | LEADING VEHICLE: ORDINARY<br>ONCOMING VEHICLE: VERY SMALL | LEADING VEHICLE: LARGE<br>ONCOMING VEHICLE: SMALL | LEADING VEHICLE: ORDINARY<br>ONCOMING VEHICLE: LARGE | LEADING VEHICLE: SMALL<br>ONCOMING VEHICLE: ORDINARY |

| TRAVELING ENVIRONMENT | Lo→Hi SWITCHING TIME | |
|---|---|---|
| | LEADING VEHICLE EXIST→GONE | ONCOMING VEHICLE EXIST→GONE |
| COUNTRY AREA | 2s | 1s |
| URBAN AREA | 4s | 2s |
| TUNNEL AREA | ∞ | ∞ |

IN THE EXAMPLE, TIME SETTING IS ARBITRARY.

TRAVELING ENVIRONMENT DETECTION DEVICE

CROSS-REFERENCE TO RELATED APPLICATION

This application is a U.S. National Phase Application under 35 U.S.C. 371 of International Application No. PCT/JP2013/063368 filed on May 14, 2013 and published in Japanese as WO 2013/172324 A1 on Nov. 21, 2013. This application is based on and claims the benefit of priority from earlier Japanese Patent Application No. 2012-114854 filed May 18, 2012, the entire disclosures of each of the above applications are incorporated herein by reference.

BACKGROUND OF THE INVENTION

1. Technical Field

The present invention relates to a traveling environment detection device that detects an environment where a vehicle is traveling and a traveling environment detection program.

2. Background Art

Conventionally, in order to detect the surrounding vehicle, there has been known a technique for detecting a light source (a headlight, a tail lamp, etc.) of a vehicle using an imaging element. As an example of the technique, there has been known a method in which, when a light source and the light emitted by the light source and reflected from a road surface are detected, the light source is detected as a light source of a vehicle (for example, see PTL1).

[PTL1] Japanese Patent Application Publication No. 2010-040001

SUMMARY

However, in an actual traveling environment, there are some cases where the light reflected from the road surface cannot be detected. Accordingly, there are some difficult cases to detect a light source of a vehicle according to the above technique of PTL1.

The inventors have considered that accurate estimation of a traveling environment when a vehicle travels can, for example, recognize a light source of a vehicle more readily, thereby improving accuracy of controlling the vehicle. Therefore, this disclosure has its object to improve detection accuracy of a traveling environment by a traveling environment detection device that detects the traveling environment where a vehicle travels, and a traveling environment detection program.

In an embodiment of the traveling environment detection device which has been made in order to achieve the above-described object, an image obtaining means obtains a captured image of the outside of the vehicle, and a parameter extracting means extracts a parameter relating to brightness of a road surface of a road where the vehicle is traveling from the captured image. A traveling environment estimating means estimates the traveling environment of the own vehicle on the basis of the parameter.

Here, in the present invention, the parameter based on not brightness of the whole captured image or brightness of the midair but the brightness of a road surface is used. That is because there is less light on the road surface, therefore brightness can be calculated accurately without being influenced by a specific light source. Asphalt used widely in road surfaces tends to show brightness depending on the average brightness of the surrounding area. Therefore, the brightness of the surrounding brightness can be detected more accurately, compared with when the brightness is detected on the basis of the brightness of the whole captured image or the brightness of the midair.

According to the traveling environment detection device, by estimating the traveling environment on the basis of the parameter of the brightness of the road surface, the brightness of the surrounding area can be detected more accurately. Accordingly, the traveling environment can be detected accurately according the brightness of the surrounding area.

The traveling environment may have a light source extracting means for extracting a light source from the captured image. Also, the traveling environment may have a light source determining means for determining whether or not the light source is a light source of a vehicle on the basis of probability information in which each position in the captured image is related to a respective probability of being a light source of a vehicle. Further, the traveling environment detection device has a probability changing means for the relation between the position in the captured image and the probability of being a light source of a vehicle in the probability information, depending on the estimated traveling environment.

According to the traveling environment detection device, because the probability information can be changed depending on the traveling environment, it can accurately be determined whether or not the light source in the captured image is a light source of a vehicle, depending on the traveling environment.

In order to achieve the above-described object, there may be a traveling environment detection program for making a computer serve as each means configuring the traveling environment detection device.

BRIEF DESCRIPTION OF DRAWINGS

In the accompanying drawings:

FIG. 3 is a flowchart showing a traveling environment estimation process and a vehicle light source determination process in the light control process.

FIG. 4 is a chart showing transition of brightness of a road surface and its change rate depending on the traveling environment.

FIG. 5 is a table merging (a) features of the brightness of the road surface and its change rate depending on the traveling environment; and (b) trends of types of light sources existing inside and outside a traveling zone.

FIG. 6 is a view showing areas, which is divided by positions of white lines, in a captured image (a), and a view showing weights given the traveling environments and the areas (b).

DETAILED DESCRIPTION OF THE PREFERRED EMBODIMENTS

Hereinafter, an embodiment according to the present invention is described with the drawings.

Configuration of this Embodiment

Figure 1:
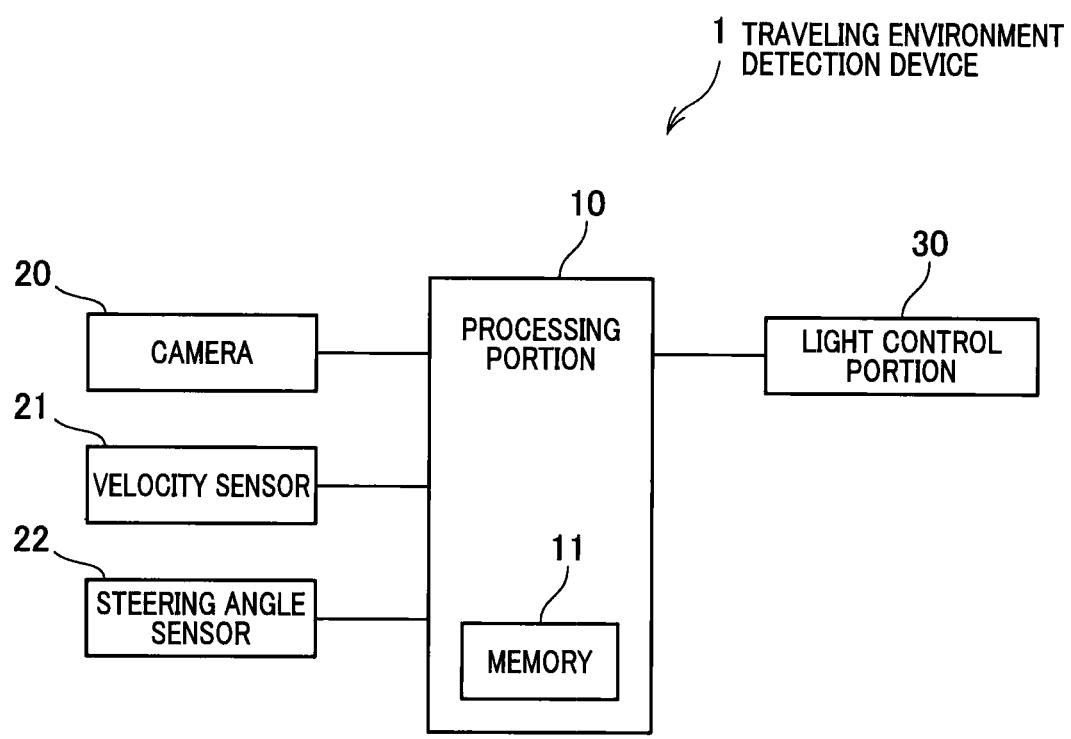
FIG. 1 is a block chart showing a schematic configuration of a traveling environment detection device 1 to which the present invention is applied.

A traveling environment detection device 1 shown in FIG. 1 has a function of a light controlling system mounted to a vehicle such as a passenger car. The light controlling system changes a direction of an optical axis of a headlight of the own vehicle downward to prevent dazzling, when there is another vehicle around the own vehicle (for more details, there is another vehicle in a range where the headlight of the own vehicle has a possibility of occurrence of dazzling). The traveling environment detection device 1, when detecting another vehicle, detects an environment (traveling environment) where the own vehicle is travelling, and changes settings for recognizing a light source depending on the traveling environment. Thereby, the traveling environment also has a function for improving recognition accuracy of light sources.

Specifically, the traveling environment detection device 1 has a processing portion 10, a camera 20, a velocity sensor 21, a steering angle sensor 22, and a light control portion 30. The camera 20 is a color camera imaging the traveling direction (especially, the forward direction) of the vehicle in color. The camera 20 sends the processing portion 10 the captured image. In this embodiment, the camera 20 is disposed such that the inside of the range lit by the headlight is at least included in the imaging range.

The velocity sensor 21 and the steering angle sensor 22 have public known configurations, and they are used for estimating the traveling direction of the vehicle. The velocity sensor 21 and the steering angle sensor 22 send the respective detection results to the processing portion 10.

The light control portion 30 controls a lighting range by the headlight, in response to reception of a switching command for switching lights of the vehicle to be activated from the processing portion 10. At this time, the light control portion 30 changes the lighting range of the head light such as not to include the light source within the lighting range.

In this embodiment, the light control portion 30 switches the light of the vehicle to be activated from a high beam (a light for traveling) to a low beam (a light for passing each other) to change the lighting range. Alternatively, there may be adopted a configuration for directing the optical axis to a direction (for example, downward or leftward) where there is no vehicle in response to the command from the processing portion 10.

The processing portion 10 is configured as a well-known microcomputer having a CPU and a memory 11 such as a ROM or a RAM. The processing portion 10 executes processes such as a light control process described later on the basis of programs (which include a program for detecting a vehicle light source) stored in the memory 11. Further, the memory 11 stores parameters (which include values corresponding to parameters such as size, color, position such as height, distance between a pair of lights or behavior) indicating characteristics of lights of vehicles and parameters indicating characteristics of light sources except for the lights of vehicles. The parameters stored in the memory 11 are used for detecting the light source indicating a light of a vehicle in the captured image by discriminating it from the light sources except for the lights of vehicles.

Process of this Embodiment

Figure 2:
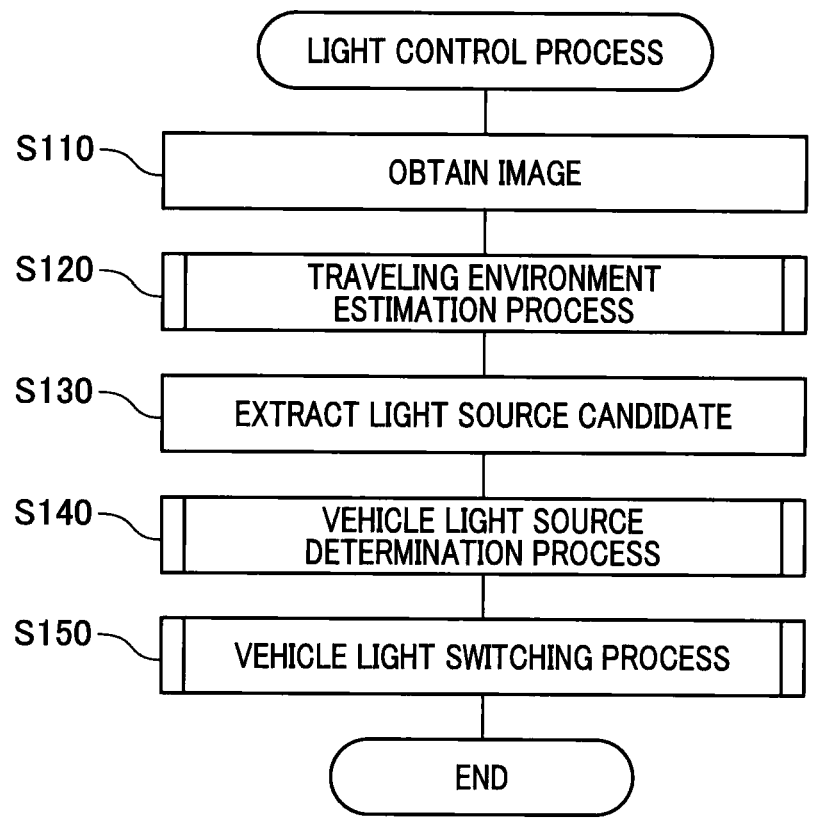
FIG. 2 is a flow chart showing a light control process which a processing portion 10 executes.

Next is described the light control process shown in FIG. 2. The light control process is a process in which the processing portion detects the light source indicating a light of a vehicle from the captured image by recognition and controls the direction of the optical axis of the headlight.

On a power source of a vehicle being turned on, the light control process is started. Thereafter, the processing portion executes the light control process every given period (for example, every 100 ms). Specifically, as shown in FIG. 2, at first, the processing portion obtains the image captured by the camera 20 (S110).

Subsequently, the processing portion performs a traveling environment estimating process (S120). The traveling environment estimating process is a process in which the processing portion estimates the traveling environment of the own vehicle on the basis of brightness of a road surface.

Specifically, as shown in (a) of FIG. 3, at first, the processing portion detects a white line as a lane marker (S210). In this process, the white line in the captured image is detected using well-known white line detection methods and the like.

Subsequently, the processing portion detects the brightness of the road surface (S220). In this process, the processing portion specifies the area of the road surface by considering the detected white line as a border line parting between the inside and the outside of a traveling zone (a traveling area). For example, when the white lines are detected on the left side and the right side of the traveling area of the own vehicle, the area at the inside of the white lines, which does not include the white lines, is specified as the area of the road surface.

Thereafter, the processing portion detects the brightness of the road surface by calculating the average luminance of the specified area of the road surface. Alternatively, the brightness of the road surface may be luminance of a given position (an arbitrary position) on the road surface. The detection result of the brightness of the road surface is held in the memory 11 for a given duration (for example, 20 detection results).

Subsequently, the processing portion reads the brightness of the road surface detected before the last time, and performs time-series analysis on the basis of the time-series data of the brightness of the road surface. Specifically, the processing portion detects change rate (time rate of change such as temporal differentiation) of the brightness of the road surface or change period (S230). Thereafter, the processing portion determines (estimates) the traveling environment by using the parameter relating to the brightness of the road surface such as the brightness of the road surface, the change rate of the brightness of the road surface or the change period of the brightness of the road surface (S240).

Here, as shown in FIG. 4 and (a) of FIG. 5, when the traveling environment is categorized into three types, country area, urban area and tunnel area, depending on the brightness of the surrounding area, the country area has the following characteristics. That is, in the country area, the brightness (an instantaneous value of the brightness of the road surface, a time average, an integration value for a given time, a base value Lb (a brightness of the road surface whose change rate is a predetermined value or less), etc.) of the road surface is dark, the change period of the brightness of the road surface is long or there is no periodicity, and the change amount of the brightness of the road surface is comparatively small. In the urban area, there are the following characteristics. That is, the brightness of the road surface is bright. The change period is sometimes short, sometimes long, or there are some cases having no periodicity. Further, the change amount of the brightness of the road surface is comparatively large.

The tunnel area has the following characteristics, that is, the brightness of the road surface is bright, the change period of the brightness of the road surface is short, and the change amount of the brightness of the road surface is comparatively small. Especially, in the tunnel, there is a characteristic in that variation in the change amount (the difference between the local maximum values of the brightness and the difference between the local minimum values of the brightness) is small.

It may be determined whether the brightness of the road surface is bright or dark by comparing the brightness of the road surface with a reference luminance designed on the basis of preliminary tests. Thus, in the process of determining the traveling environment, the processing portion calculates a respective probability of being each traveling environment, on the basis of the brightness of the road surface, the change rate of the brightness and the change period of the brightness, and outputs (records) the memory 11 the traveling environment having the maximum probability as the current traveling environment.

After finishing the process, returning to FIG. 2, the processing portion extracts light source candidates (S130). Well-known methods can be used for the extraction of the light source candidates. For example, the processing portion performs it by cutting out the continuous area where the luminance is at a predetermined value or more, or where the difference in luminance from the periphery is at a predetermined value or more. In this process, the processing portion cuts out each minimum area which includes the whole portion as one light source in the captured image by rectangle (oblong), and labels (numbers) each cut-out area. In this process, the larger the light source in the captured image is, the larger cut-out area is.

Subsequently, the processing portion executes a vehicle light source determination process (S140). In this process, the processing portion gives the light source a weight depending on the traveling environment or the light source position in the captured image to determine whether or not the light source originates from a vehicle.

Further, the processing portion sets a switching time of the headlight, depending on the traveling environment.

Here, in the past tests or experiences, as shown in (b) of FIG. 5, an oncoming vehicle approaching from the forward direction of the own vehicle toward the own vehicle and a leading vehicle traveling ahead of the own vehicle toward the same direction as the own vehicle tend to be within the traveling zone in many cases, and be outside the traveling zone in a few cases. Light reflectors (cat's-eyes), signs and the like tend to be within the traveling zone in a few cases, and be outside the traveling zone in many cases. Accordingly, considering these tendencies, each area in the captured image is weighted.

Specifically, at first, the processing portion divides the captured image into a plurality of areas, and weighs each area depending on the traveling environment (S310). In this process, as shown in (a) of FIG. 6, the processing portion divides the captured image into the plurality of areas according to the positions of the white lines detected in the captured image.

More specifically, the area above than the point at infinity (intersection point of extended lines of the white lines, the position marked by + in (a) of FIG. 6) in the captured image is defined as an area A. In the area including the traveling zone (the own lane) where the own vehicle is traveling and the adjacent traveling zone (the adjacent lane), the area which is more leftward than the front of the own vehicle is defined as an area C, and the area which is more rightward than the front of the own vehicle is defined as an area D. Further, the area which is more leftward than the area C is defined as an area B, and the area which is more rightward than the area D is defined as an area E.

As shown in (b) of FIG. 6, the heaviest weight is provided to the areas C and D, which have the highest existing probability of leading vehicles or oncoming vehicles. In the case where the traveling environment is the country area, since the amount of traffic is small and the existing probability of leading vehicles is low, the weight for the area C is set lower than when the traveling environment is the urban area or the tunnel area.

In the case where the traveling environment is the tunnel area, since the lights of the tunnel are positioned at the area A, the weight is set 0 for excluding this. On the other hand, if the traveling environment is a country area, since the country area is rougher than the urban area and the existing probability of vehicles in the area A is high, the weight for the area A is set larger than that in the case of the urban area.

Subsequently, the processing portion calculates a feature quantity of a light candidate and determines whether or not the light source is a vehicle light source on the basis of the feature quantity (S320). At first, in the process of calculating the feature quantity of the light candidate, the processing portion calculates a feature quantity based on positions by relating the position of the light source to the aforementioned weight. In addition, a stationary image level feature quantity, a pair feature quantity and a time-series feature quantity may be considered.

Here, the stationary image level feature quantity indicates a feature quantity based on color or shape of single light source which a light source has, the pair feature quantity indicates a feature quantity based on a relation between a light source and the other light source positioning in the horizontal direction, and the time-series feature quantity indicates a feature quantity based on the results of tracking a light source. These feature quantities are set depending on the probability of the parameter of the color, shape or the like of the light source matching the reference value (comparison value) stored in the memory 11.

Thus, the processing portion calculates the light candidate feature quantity, and calculates a probability of the light source being the vehicle light source on the basis of each feature quantity. Here, the probability of being the vehicle light source is calculated such as by calculating a weighted average of the feature quantities. The feature quantities may be related to the probability of being the vehicle light source preliminarily by way of experiment.

The processing portion compares a predetermined threshold value with the probability of being the vehicle light source, removes the light source which has the probability less than the predetermined threshold value as a disturbance, thereby determining the remained light source as the light of a vehicle. Subsequently, the processing portion sets the switching time indicating a time until which the headlight is switched from the low beam to the high beam, depending on the traveling environment, the headlight depending on the traveling environment (S330).

Figures 7, 8:
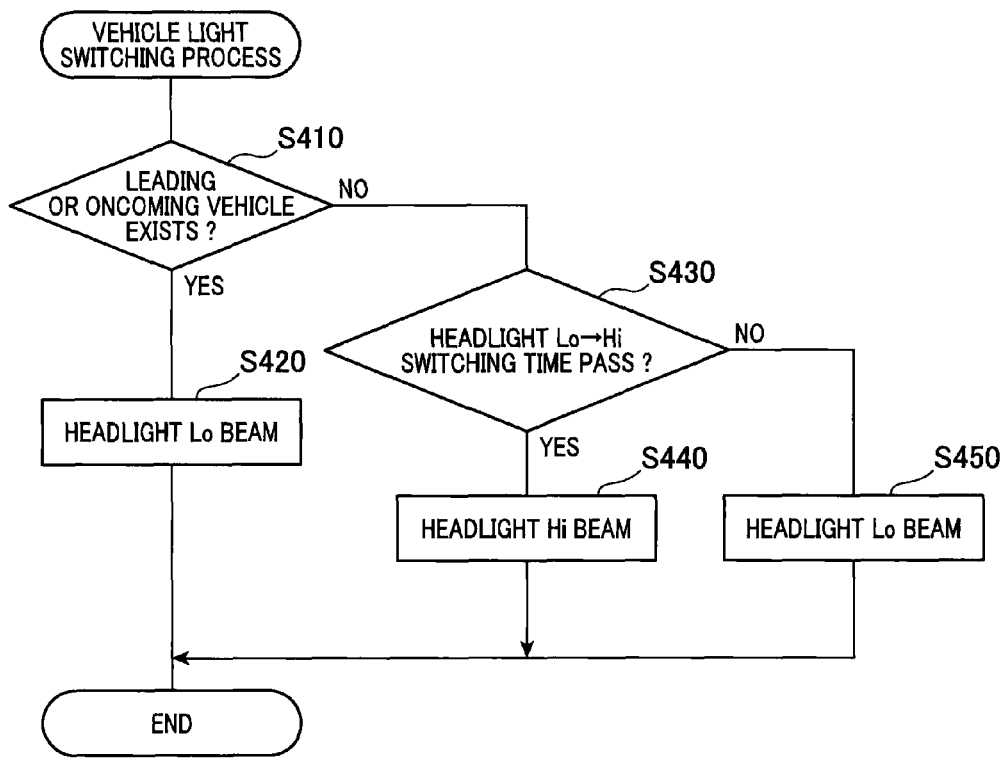
FIG. 7 is a table showing a specific example of setting a light switching time depending on the traveling environment.
FIG. 8 is a flow chart showing a vehicle light switching process in the light control process.

In this process, as shown in FIG. 7, when the traveling environment is the urban area, the switching time is set longer than that of when it is the country area. When the traveling environment is the tunnel area, the switching time is set longer than that of when it is the urban area. That is for reducing the burden of frequently switching the light in the urban area having more traffic amount than the country area having. Also, the reason is that it is bright in the tunnel because of lamps and there is less need for switching to the high beam.

In the example shown in FIG. 7, the switching time of when the oncoming vehicle is gone is set shorter than that of when the leading vehicle is gone. That is because there is need for securing the field of view just after passing each other.

After setting the switching time, the vehicle light source determination process is terminated. Thereafter, returning to FIG. 2, the processing portion executes a vehicle light switching process (S150). This process is a process where the processing portion gives the light control portion 30 a designation of type of the lights to be activated depending on the presence or absence of the leading vehicle or the oncoming vehicle.

Specifically, as shown in FIG. 8, the processing portion determines whether or not a leading vehicle or an oncoming vehicle is detected in the aforementioned process (S410). If a leading vehicle or an oncoming vehicle is detected (S410: YES), the processing portion sends the light control portion 30 the switching command for switching the headlight to the low beam (S420), and the vehicle light switching process is terminated.

If no leading vehicle or no oncoming vehicle are detected (S410: NO), the processing portion determines whether or not the switching time set in the aforementioned process has passed after detection of a leading vehicle or an oncoming vehicle has stopped (S430). If the switching time has passed (S430: YES), the processing portion sends the light control portion 30 the switching command for switching the headlight to the high beam (S440), and the vehicle light switching process is terminated.

If the switching time has not passed yet (S430: NO), the processing portion sends the light control portion 30 the switching command for switching the headlight to the low beam (S450), and the vehicle light switching process is terminated. After the process is terminated, the processing portion terminates the light control process.

Effects According to this Embodiment

In the traveling environment detection device 1 described above in detail, the processing portion 10 obtains the captured image where the traveling direction of the own vehicle is captured, and extracts, from the captured image, the parameter relating to the brightness of the road surface at the road where the own vehicle is traveling. Thereafter, the processing portion estimates the traveling environment of the own vehicle on the basis of the parameter.

According to the traveling environment detection device 1, the estimation of the traveling environment on the basis of the parameter relating to the brightness of the road surface can achieve more accurate detection of brightness of the surrounding area. Accordingly, the traveling environment can be detected accurately.

The processing portion 10 in the traveling environment detection device 1 extracts a light source from the captured image, and determines whether or not the light source is a light source of a vehicle by using the probability information where the probability of being a light source of a vehicle is related to the position in the captured image. Thereafter, the processing portion changes the relation of the position in the captured image and the probability of being a light source of a vehicle in the probability information, depending on the estimated traveling environment.

According to the traveling environment detection device 1, the probability information can be changed depending on the traveling environment. Accordingly, it can properly be determined whether or not a light source in the captured image is a light source of a vehicle, depending on the traveling environment.

Further, the traveling environment detection device 1 has the light control portion 30 which changes, when the light source has been determined as a light source of a vehicle, the lighting area of the headlight such that the lighting area does not include the above-described light source.

According to such a traveling environment detection device 1, the headlight of the own vehicle can be made dazzle other vehicles very little. Further, other vehicles can be detected accurately, which can prevent a glitch when the lighting area of the headlight is changed.

The processing portion 10 of the traveling environment detection device 1 extracts white lines marked on the road surface from the captured image, and extracts the parameter relating to the brightness of the road surface at the area except for the area including the white lines in the captured image.

According to the traveling environment detection device 1, the brightness of the road surface is determined except for the area of the white lines in the captured image, which can achieve more accurate detection of the brightness of the road surface.

Further, the processing portion 10 of the traveling environment detection device 1 changes the relation of the probability information depending on the position of the white lines.

According to such a traveling environment detection device 1, the relation between the positions in the captured image and the probability of being a light source of a vehicle in the probability information can be changed properly by estimating the area where other vehicles are traveling according to the positions of the white lines.

The processing portion 10 of the traveling environment detection device 1 extracts the average luminance of the road surface portion in the captured image as the parameter.

Such a traveling environment detection device 1 can prevent false detection such as when a light source lights a part of the road surface, compared with the case where the luminance is detected from only a part of the road surface.

Further, the processing portion 10 of the traveling environment detection device 1 extracts a time rate of change in luminance of the road surface portion in the captured image as the parameter.

Because the time rate of change in luminance of the road surface portion is detected, the traveling environment detection device 1 can detect a periodical change in luminance of the road surface portion such as during traveling at the tunnel area, a non-periodical change in luminance such as during traveling at the urban area, and so on. The traveling environment such as the tunnel area or the urban area can be estimated on the basis of the time rate of change in luminance.

Modifications

An aspect of the present invention is not limited to the above-described embodiment, and various aspects can be adopted as long as they are within the scope of the present invention.

For example, in the above embodiment, the configuration of detecting the traveling environment is used in the configuration of controlling the light. Similarly, another configuration of controlling the vehicle using the traveling environment can be applied. For example, there may be a configuration where air conditioning is changed to interior air circulation, when it is detected that the traveling environment is the tunnel area or the like in the traveling environment estimation process.

In the above-described embodiment, the velocity sensor 21 and the steering angle sensor 22 are used for determining the traveling direction of the vehicle. However, methods are not limited to this as long as the traveling direction of the vehicle can be determined. For example, the traveling direction of the vehicle can be determined using velocity indicated in an indicator, yaw rate signal or the like.

As the vehicle light source information, there is used the probability of being a vehicle light source which is set depending on the position in the captured image for the respective traveling environment, and a light source of a vehicle is discriminated from other light sources on the basis of the probability. However, it is not limited to this. For example, although the vehicle light source information is information on position in the captured picture, this may be used not for discriminating but for extracting, and search range in the captured image may be set depending on the traveling environment when a light source is extracted from the captured image. As the vehicle light source information, there may be used feature information (shape, etc.), except for position, of vehicle light sources depending on the traveling environment, and they may be compared with the feature of the light extracted from the captured image to execute the recognition process (discrimination process) of a vehicle light source.

Relation of Configurations of the Embodiments and Configurations of the Invention The light control portion 30 corresponds to a lighting area change means of the present invention. The process of S110 in the processes performed by the processing portion 10 corresponds to an image obtaining means of the present invention, and the process of S130 corresponds to a light source extracting means of the present invention.

The process of S210 of the above embodiment corresponds to a lane diving line extracting means of the present invention, the process of S220 and S230 corresponds to a parameter extracting means of the present invention. Further, the process of S240 corresponds to a traveling environment estimating means of the present invention, the process of S310 corresponds to a probability changing means of the present invention, the process of S130 and S320 corresponds to a vehicle light source detecting means of the present invention.

The traveling environment detection device need not to be unified as a device mounted on a vehicle. For example, a part thereof may be provided via a network etc. outside a vehicle.

REFERENCE SIGNS LIST

1 . . . traveling environment detection device, 10 . . . processing portion,
11 . . . memory
20 . . . camera, 21 . . . velocity sensor, 22 . . . steering angle sensor
30 . . . light control portion

What is claimed is:

1. A traveling environment detection device, comprising:
   an image obtaining unit obtaining captured images of an outside of a vehicle, the images being captured at different times;
   a parameter extracting unit extracting a parameter from the captured images, the parameter being a parameter relating to brightness of a road surface of a road where the vehicle is traveling, the parameter extracting unit extracting, as the parameter relating to brightness of a road surface, time rate of change in luminance of road surface portions in the captured images;
   a traveling environment estimating unit estimating a traveling environment of the vehicle on the basis of the parameter;
   a vehicle light source information obtaining unit obtaining vehicle light source information for detecting a light source of a vehicle, the vehicle light source information depending on the estimated traveling environment;
   a vehicle light source detecting unit detecting the light source of a vehicle from the captured images on the basis of the vehicle light source information depending on the traveling environment; and
   a lighting area change unit changing a lighting area of a headlight such that the lighting area is out of the light source of a vehicle, when the vehicle light source detecting unit has detected the light source of a vehicle, wherein
   the vehicle light source detecting unit includes:
       a light source extracting unit extracting a light source from the captured images; and
       a light source determining unit determining whether or not the light source is the light source of a vehicle on the basis of probability information, the probability information including probability of being the light source of a vehicle related to positions in the captured images, and
   the vehicle light source information obtaining unit includes a probability changing unit changing the relation between the positions in the captured images and the probability of being the light source of a vehicle in the probability information, depending on the estimated traveling environment.

2. The traveling environment detection device according to claim 1, further comprising a lane marker extracting unit extracting a lane marker marked on a road surface from the captured images, wherein the probability changing unit changes the relation in the probability information in accordance with the position of the lane marker.

3. The traveling environment detection device according to claim 1, further comprising a lane marker extracting unit extracting a lane marker marked on a road surface from the captured images, wherein
   the parameter extracting unit extracts the parameter relating to the brightness of the road surface at an area except for another area including the lane marker in the captured images.

4. The traveling environment detection device according to claim 1, wherein
   the parameter extracting unit extracts, as the parameter, an average luminance of a road surface portion in the captured images.

5. A non transitory computer-readable storage medium containing thereon a program for performing the following steps in a traveling environment detection device:
   obtaining captured images of an outside of a vehicle, the images captured at different times;
   extracting a parameter from the captured images, the parameter being a parameter relating to brightness of a road surface of a road where the vehicle is traveling, the parameter extracting step extracting, as the parameter relating to brightness of a road surface, time rate of change in luminance of road surface portions in the captured images;
   estimating a traveling environment of the vehicle on the basis of the parameter;
   obtaining vehicle light source information for detecting a light source of a vehicle, the vehicle light source information depending on the estimated traveling environment;
   detecting the light source of a vehicle from the captured images on the basis of the vehicle light source information depending on the traveling environment; and
   changing a lighting area of a headlight such that the lighting area is out of the light source of a vehicle, when the vehicle light source detecting step has detected the light source of a vehicle, wherein
   the step for detecting the light source of the vehicle includes:
       extracting a light source from the captured images; and
       determining whether or not the light source is the light source of a vehicle on the basis of probability information, the probability information including probability of being the light source of a vehicle related to positions in the captured images, and the step for obtaining vehicle light source information includes a probability changing unit changing the relation between the positions in the captured images and the probability of being the light source of a vehicle in the probability information, depending on the estimated traveling environment.

6. A traveling environment detection device, comprising:
a camera capturing images of an outside of a vehicle at different times;
a detecting unit detecting brightness of road surfaces from the captured images to obtain time-series data of the brightness of the road surface;
a parameter extracting unit extracting a parameter relating to the brightness of the road surface by performing time-series analysis on the basis of the obtained time-series data of the brightness of the road surface;
a traveling environment estimating unit estimating a traveling environment of the vehicle on the basis of the extracted parameter and characteristics of the parameter corresponding to each traveling environment; and
a controlling unit controlling on the basis of the estimated traveling environment.

7. The traveling environment detection device according to claim 6, wherein the traveling environment estimating unit estimates the traveling environment on the basis of change period or change amount of the brightness of the road surface in each traveling environment as the characteristics of the parameter corresponding to each traveling environment.

* * * * *